United States Patent
Hunt et al.

(10) Patent No.: US 7,979,559 B2
(45) Date of Patent: Jul. 12, 2011

(54) COMMUNICATION NETWORK METHOD AND APPARATUS HAVING INTELLIGENT PERIPHERAL RESOURCE PLATFORM WITH VARIABLE NUMBER OF PORTS ASSIGNED TO CONCURRENT DIFFERENT SERVICES

(75) Inventors: Rowland G Hunt, Ipswich (GB); Paul Williamson, Woodbridge (GB)

(73) Assignee: British Telecommunications public limited company, London (GB)

( * ) Notice: Subject to any disclaimer, the term of this patent is extended or adjusted under 35 U.S.C. 154(b) by 2611 days.

(21) Appl. No.: 10/204,701

(22) PCT Filed: Mar. 2, 2001

(86) PCT No.: PCT/GB01/00921
§ 371 (c)(1),
(2), (4) Date: Aug. 23, 2002

(87) PCT Pub. No.: WO01/72054
PCT Pub. Date: Sep. 27, 2001

(65) Prior Publication Data
US 2003/0023727 A1      Jan. 30, 2003

(30) Foreign Application Priority Data
Mar. 20, 2000  (EP) .................................... 00302230

(51) Int. Cl.
*G06F 15/16* (2006.01)
(52) U.S. Cl. ........ 709/228; 709/238; 709/217; 701/213; 455/519
(58) Field of Classification Search .................. 709/224, 709/220, 228, 238, 217; 379/67.1, 230, 39; 455/519; 701/213
See application file for complete search history.

(56) References Cited

U.S. PATENT DOCUMENTS

| | | | | |
|---|---|---|---|---|
| 5,475,737 A * | 12/1995 | Garner et al. | ............. | 379/88.26 |
| 5,570,410 A | 10/1996 | Hooshiari | | |
| 5,913,160 A * | 6/1999 | Leung | ............. | 455/403 |
| 6,115,742 A * | 9/2000 | Franklin et al. | ............. | 709/224 |
| 6,282,281 B1 * | 8/2001 | Low | ............. | 379/230 |
| 6,351,646 B1 * | 2/2002 | Jellema et al. | ............. | 455/461 |
| 6,430,268 B1 * | 8/2002 | Petite | ............. | 379/39 |
| 7,023,839 B1 * | 4/2006 | Shaffer et al. | ............. | 370/356 |
| 7,284,203 B1 * | 10/2007 | Meeks et al. | ............. | 715/751 |
| 2002/0061092 A1 * | 5/2002 | Maropis et al. | ............. | 379/67.1 |

FOREIGN PATENT DOCUMENTS

| | | |
|---|---|---|
| EP | 0804044 A1 | 4/1996 |
| WO | WO 96/42173 | 12/1996 |
| WO | WO 97/45792 | 12/1997 |

* cited by examiner

*Primary Examiner* — Tammy T Nguyen
(74) *Attorney, Agent, or Firm* — Nixon & Vanderhye P.C.

(57) ABSTRACT

A service platform in a communications network connects callers to a service resource platform when implementing services requiring specialized resources. A number of different services use a common service resource platform. The service platform is programmed with respective maximum values for the number of calls originating from each service that may be connected to the service resource platform at one time and allows the call to be connected to the service resource platform only when the count value for the respective service is less than the maximum count value. The service resource platform may have a single network address and a common range of ports that are freely allocated to calls generated by the different services running on the service platform.

7 Claims, 5 Drawing Sheets

COMMUNICATION NETWORK METHOD AND APPARATUS HAVING INTELLIGENT PERIPHERAL RESOURCE PLATFORM WITH VARIABLE NUMBER OF PORTS ASSIGNED TO CONCURRENT DIFFERENT SERVICES

This application is the US national phase of international application PCT/GB01/00921 filed 2 Mar. 2001 which designated the U.S.

BACKGROUND

1. Technical Field

The present invention relates to a communications network, and in particular to a network employing an IN (intelligent network) architecture.

2. Related Art

In a network employing an IN architecture, basic call processing is carried out by local switching nodes. In the case of anything other than basic call processing, control of the call is passed to a service platform, sometimes termed a service control point (SCP). For some services, such as number translation in the case of an 0800 service, all the resources required for completing processing of the call may be provided by the service platform. However, other services require the use of specialised resources such as, for example, voice interaction capabilities. These resources are provided by a service resource platform termed an intelligent peripheral (IP). Typically, the service platform, at an appropriate point in a call, sends instructions to the local switching node to connect one of the parties to the call to the intelligent peripheral. The intelligent peripheral is connected via a signalling interface to the service platform and returns data to the service platform. This interface, and also the interface between the SCP and the local switching nodes may use INAP (intelligent network application protocol). INAP is an internationally agreed standard for Intelligent Networks. The standard is set out in full in "Intelligent Network (IN); Intelligent Network Capability Set 1(CS1); Core Intelligent Network Application Protocol (INAP)", European Telecommunications Standards Institute, pr ETS 300 374-1.

Sometimes a number of different services may make use of the same specialised service resources. For example, the use of voice recognition or DTMF (dual tone multi-frequency) recognition to collect information from a calling party is a feature of several different services including both inbound calling to call centres, and chargecard services, that is services in which charges are billed to a customer account rather than to the line originating the call.

BRIEF SUMMARY

According to a first aspect of an exemplary embodiment of the present invention, there is provided a method of operating a communications network including a plurality of network switches, a service platform connected by a signalling interface to the plurality of network switches, and a service resource platform, the method including, when a service provisional for a party to a call requires service resources from the platform then, under the control of the service platform, connecting a party to the call via a network switch to the service resource platform, for each of a plurality of different services requiring the service resources of the service resource platform, maintaining a count of the respective number of ongoing calls connected to the service resource platform.

This aspect of the present exemplary embodiment of the invention removes the need to pre-allocate a range of ports on a platform to a particular service, thereby making possible more efficient use of the resources provided by the platform. This is achieved by allocating resources to different services under software control by setting a limit specific to each service and admitting calls up to that limit. For example, if the resource platform has the ability to handle up to 2600 simultaneous calls, and is to be shared between two different services, then one service might be allocated a limit of 2000 calls and the other a limit of 600 calls. Preferably the platform has a single network address and a plurality of ports, and a common range of ports are accessed by the plurality of services. In this case, provided a call is admitted, then it can be freely allocated any unoccupied port on the resource platform.

BRIEF DESCRIPTION OF THE DRAWINGS

Exemplary systems embodying various aspects of the present invention will now be described in further detail, by way of example only, with reference to the accompanying drawings, in which.

DETAILED DESCRIPTION OF EXEMPLARY EMBODIMENTS

A telecommunications network employing an intelligent network (IN) architecture includes a number of service switching points (SSP's) 1 which may be located, for example, at a transit exchange or local exchange. Subscriber terminals 2 are connected, directly or indirectly, to the SSP. The SSP carries out a call control function (CCF) which comprises the basic call processes associated with the setting up of a connection between different terminals on the network. An intelligent peripheral (IP) 3 is connected to one of the service switching points. In this example, the intelligent peripheral is an interactive voice response (IVR) platform equipped to play dialogues to customers and to collect data from customer responses.

A service control point (SCP) 5 is connected to the service switching points 1 and the intelligent peripheral 3 via a signalling network 4. This network uses a digital message-based common channel signalling system known as Signalling System No. 7 (SS7) in an implementation developed by BT known as the BT national user part or NUP. The SS7 signalling system is described in further detail in Fretten K G & Davies C G: "CCITT Signalling System No. 7; Overview", British Telecommunications Eng J (April 1988).

Figure 1:
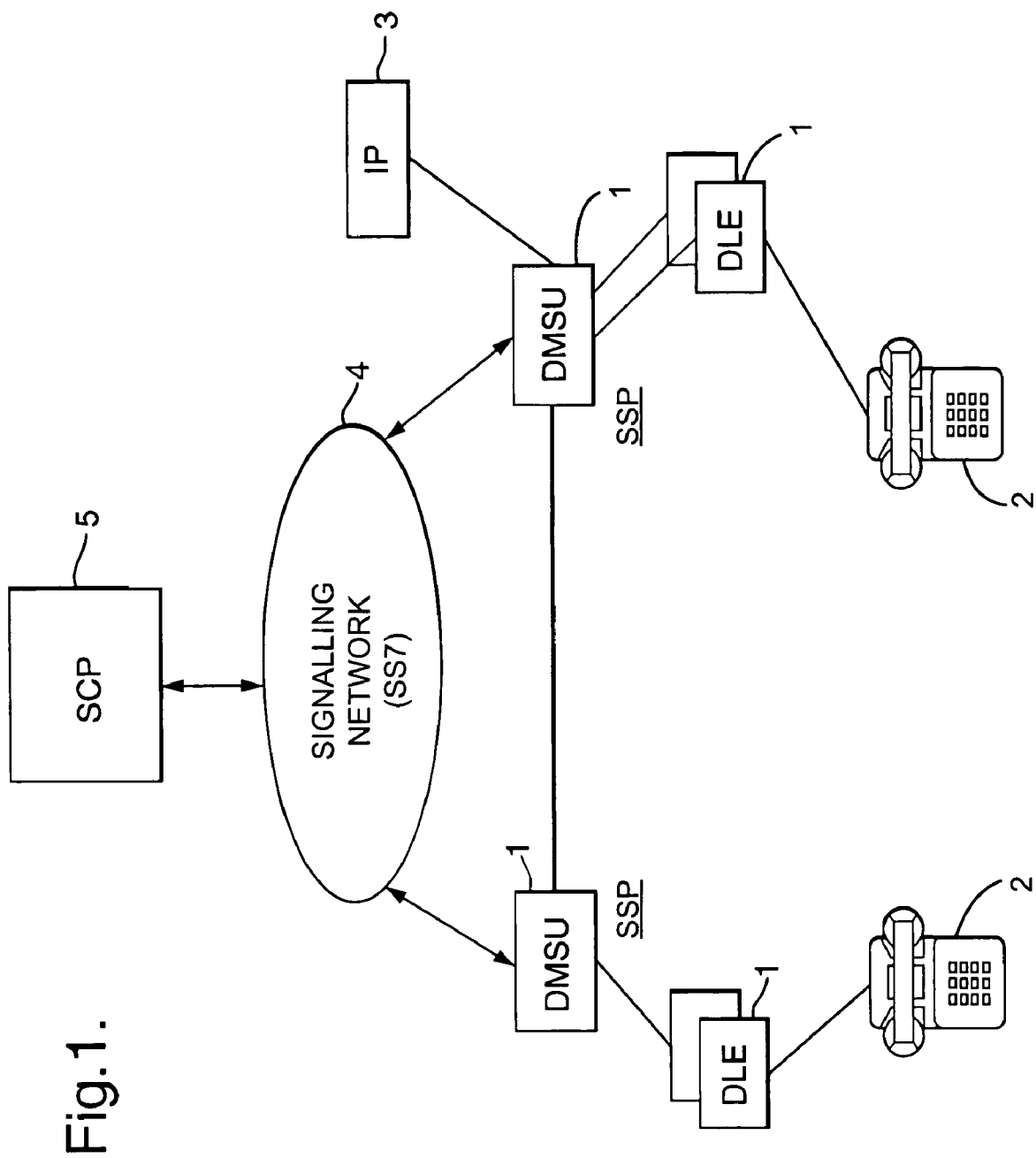
FIG. 1 is a schematic of a network embodying an exemplary embodiment of the invention.
Figure 2:
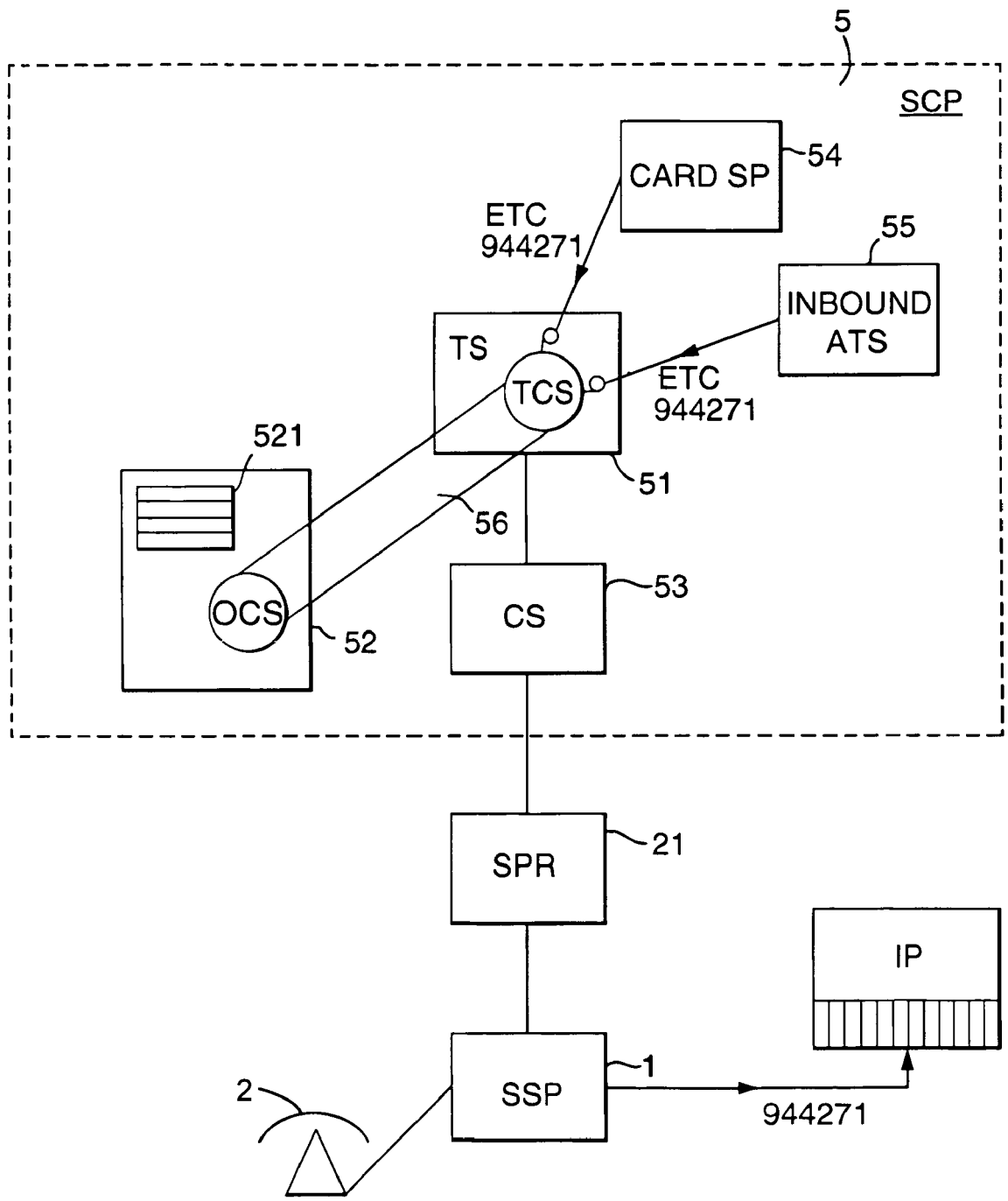
FIG. 2 is a diagram showing the architecture of the service control point and intelligent peripheral of FIG. 1.

FIG. 2 shows the architecture of the service control point and of the intelligent peripheral in further detail. The service control point includes a transaction server 51, an overload control server 52, and a communications server 53. A card services platform 54 and an inbound services advanced transaction server 55 are connected to the transaction server 51. The connections between the card services platform, the inbound services advanced transaction server, the transaction server and the communication server may all be by means of a broadband optical fibre (FDDI) local area network. The connection between the transaction server 51 and the overload control server 52 is by means of a so-called memory channel.

Figure 3:
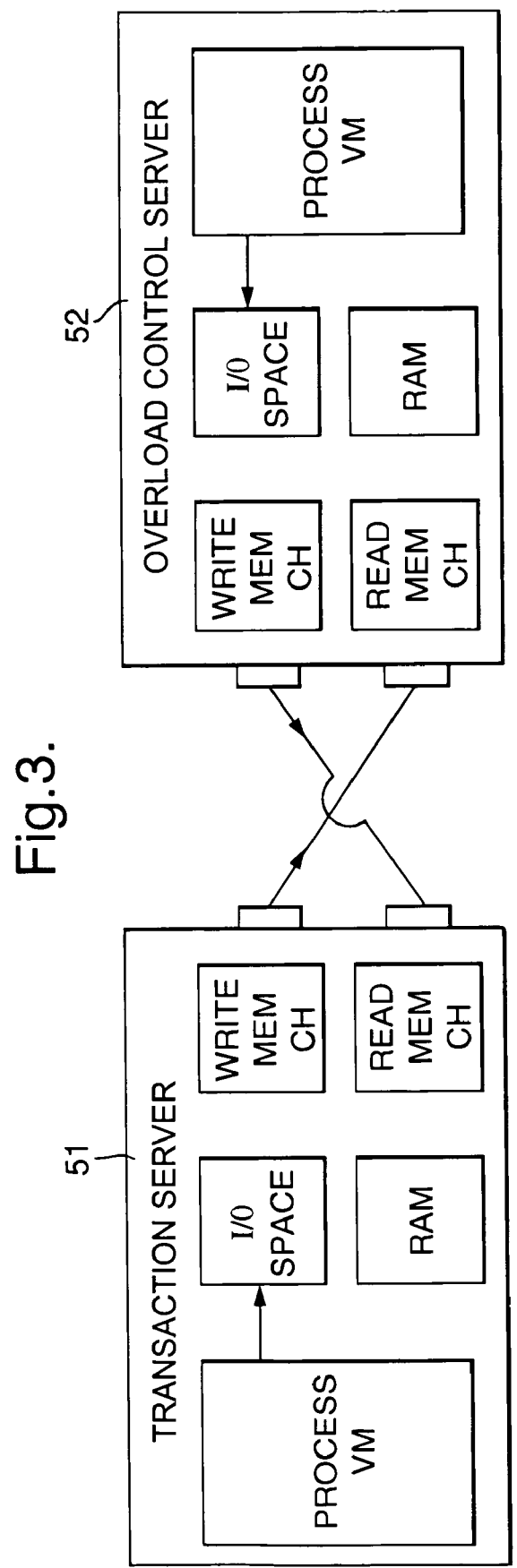
FIG. 3 is a schematic showing the memory channel of FIG. 2.

FIG. 3 illustrates how the memory channel is implemented between two platforms such as the overload control server 52 and the transaction server 51. Connections between the two platforms 51, 52 are configured to simulate a common region of shared memory from which both platforms can read or write. Process virtual memory in one of the platforms is connected to an input/output space that passes data out via the "write" memory channel via an external connection to the "read" memory channel of the other platform. From there it is written into the local RAM of the other platform.

Although in FIG. 2, only a single transaction server is shown, in general the SCP includes a multiplicity of such transaction servers. The overload control server 52 maintains in a region of memory a table 521 that records, for each of the transaction servers TCS1, TCS2 . . . a count of the number of calls in progress for each service application.

The service control point 5 is connected via a signalling point relay 21 to one or more of the service switching points 1.

Table 1 shows an example of the contents of the table 521 in the overload control server. In this example, the table holds data for two services: a card service given reference number 0 and an inbound calling service given reference number 1. The first row of the table, referenced TCS0 holds the values for the maximum number of connections per service over all the transaction servers in the service control point site. In this example, the values are 2000 for service 0 and 600 for service 1. The subsequent rows then contain the counts for each of the transaction servers on the SCP site. Specifically, the counts are derived from the TCAP server of each transaction server. Counts are accessed from the TCAP servers since it is aware of INAP messages affecting call state, and has knowledge of all calls to the intelligent peripheral.

In operation, the different services on the platforms 54 and 55 both require use of the intelligent peripheral to gather data from the customer. In the case of the card services platform 54, the intelligent peripheral is used to acquire the customer account number from the calling party. In the case of the inbound services server 55, the intelligent peripheral is used to present the calling party with a menu of choices, to enable appropriate routing of the call depending on the particular needs of the calling customer. For both services, at the relevant points in the call, the relevant service platform returns an established temporary connection (ETC) request to the transaction server. ETC requests from both platforms reference the same network address for the IP, in this example 944271. When an ETC request is received from a particular service, for example service 0, then the transaction server in conjunction with the overload control server determines from the table storing the counts of ongoing connections to the IP whether the limit for the particular service has been met. If, in this example, the number of connections from service 0 to the IP, summed over all the different TCAP servers is less than the maximum value of 2000, then the ETC request is admitted, the calling party is connected to one of the free ports on the IP at address 944271, and the count for service 0 and the respective TCAP server, for example TCS2 is incremented, e.g. from 17 to 18.

Figure 4:
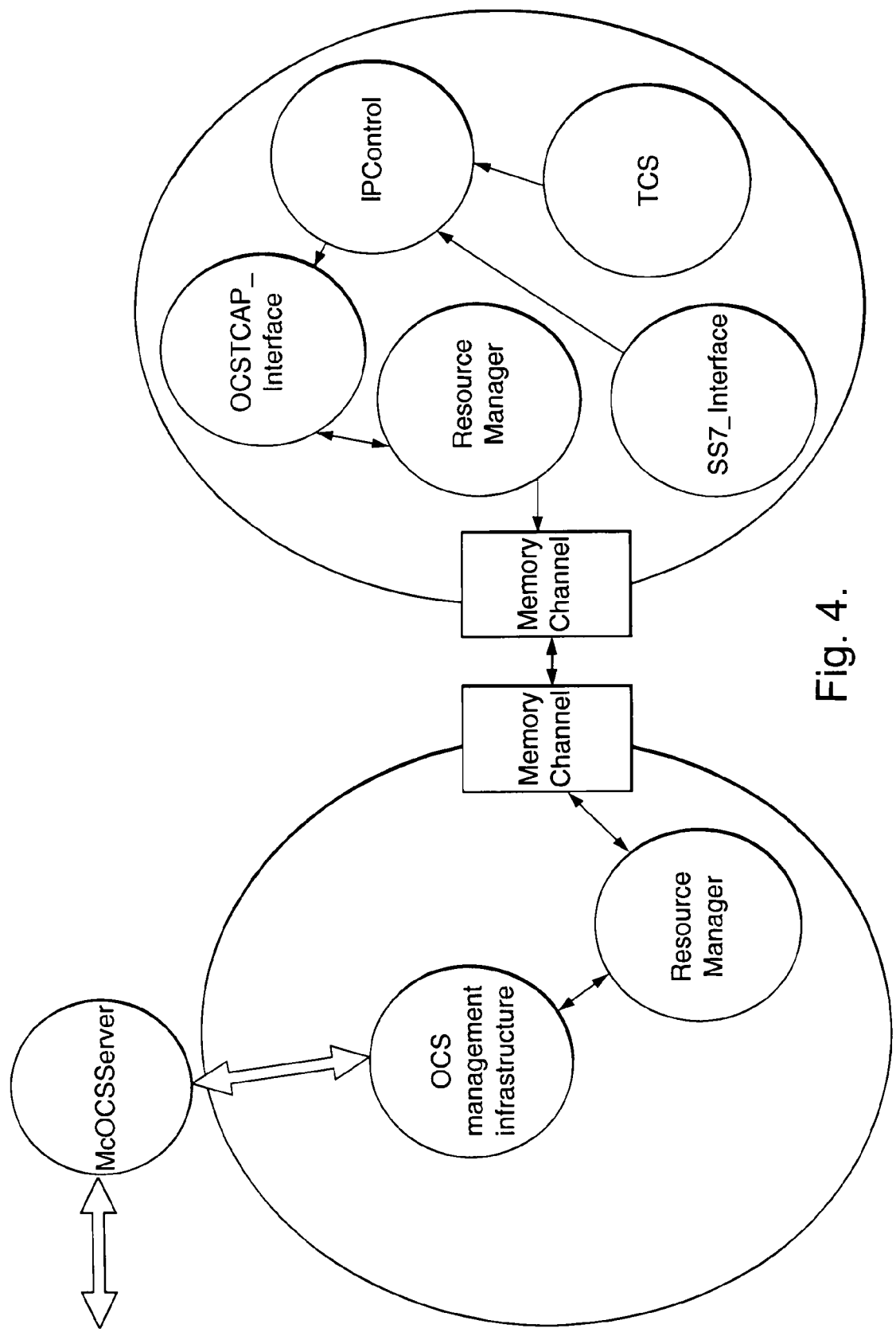
FIG. 4 is a diagram showing objects used in implementing the overload control server and transaction server.

FIG. 4 shows in further detail the objects used in the overload control server 52 and the transaction server 51 in implementing the invention. The diagram shows an object-oriented representation, in which the arrowed lines indicate signal flows between the different objects. In the transaction server, signals from an SS7 (common channel signalling system number 7) interface and from the TCAP server TCS are passed to an IP control (intelligent peripheral control) object. Signals from the IP control are output via an OCSTCAP_ interface (overload control server TCAP interface) and a resource manager into memory channel memory. As described above, memory channel memory appears to be common to the different platforms, including the OCS and TCS. However, the memory is not physically shared. Instead, writes to memory channel memory are broadcast over an I/O (input/output) bus to all the machines connected to the memory channel. At the destination machines, they are written to physical memory which is then readable by attached processors. In the OCS, the memory channel is connected to a resource manager and via the OCS management infrastructure to a memory channel OCS server. The functions implemented by these different objects will now be described in further detail.

In a preferred implementation of the SCP known as NIP2, (Network Intelligence Platform 2), TCAP Server includes a rate-based adaptive overload control for IP. TCAP Server calls a function bool IpControl::admitEtc (void)

before admitting an ETC to the network. If the function returns true, an ETC is sent; otherwise, no ETC is sent, and an ETC Fail is "faked" by TCAP Server and returned to the source of the ETC. The control is adaptive in response to ETC Fails sent from the network, and TCAP Server (actually the SS7_Interface class) calls a function void IpControl::monitorEtcFail (void)

to inform the control of a received ETC Fail.

In another implementation known as NIP3, interaction with Voice is subject to rate control which may be invoked in case of switch or core transport network problems. Rate control in this case is not service specific.

The implementation of software controlled limits for different services, termed "soft partitioning" is encapsulated in TCAP Server by enhancing the IpControl class. The decision on whether to admit an ETC is dependent on a Service Key which is passed to IpControl; also, IpControl polices the Voice IP network address to check that it corresponds to the NIP site's local Voice IP set in a TCAP Server configuration file. The new signature for admitEtc is bool IpControl::admitEtc(const unsigned int serviceKey,
    const INAP_BCD& address,
    const char* const dialledNumber)

admitEtc( ) now checks both rate control and soft partitioning before agreeing to admit the ETC.

Various events may prevent or terminate the Voice IP interaction—e.g ETC Fail, DisconnectForwardConnection, TCAP Abort, and possibly others. The TCAP Server call context information is extended with a single flag to indicate that the call is interacting with the Voice IP. If this flag is set, and the TCAP Server receives an indication from the service or network side that the interaction is over, TCS code is responsible for calling a new function on IpControl:

void IpControl::ipInteractionEnded(const unsigned int
    serviceKey)

and will clear the context flag indicating interaction with Voice IP.

If the interaction was ended by an ETC Fail, TCS code also still calls monitorEtcFail( ) to allow adaptation of Voice IP rate control.

If IpControl rejects an ETC Fail due to Voice IP rate control or due to soft partition limit, IpControl calls OCSTCAP_ Interface::congestionNotify( ) with an appropriate rejection reason. This requires the definition of the two new rejection reasons. If such rejections are sufficiently frequent, call gapping of the offending service number may occur. This is the reason for the inclusion of the dialled number string in the parameters of admitEtc( ).

Extension to OCSTCAP_Interface

This class is extended to encapsulate the TCAP Server's view of counts for soft partitioning held in Memory Channel. For NIP3 there is a requirement to maintain counts of Voice IP ports, per Service Key.

The system is designed to partition other resources in addition to the Voice IP. To permit this, the functions called on OCSTCAP_Interface will identify both a resource identifier and a partition identifier. The partition identifier may usually be equated to a Service Key The OCS configuration file defines default partition sizes against the tuple of partition identifier and resource identifier. It also defines the maximum available number of ports against each resource identifier. OCSTCAP_Interface will only accept function calls for soft partitioning which refer to those tuples of partition identifier and resource identifier which have been initialised by OCS.

The new member functions of OCSTCAP_Interface are:
bool admitCallToResource(const unsigned int resourceId,
   const unsigned int partitionId,
   bool& admitted)
bool removeCallFromResource(const unsigned int resourceId,
   const unsigned int partitionId)
bool setMaximumForResource(const unsigned int resourceId,
   const unsigned int partitionId,
   const unsigned int maximum)

Here the return value indicates success or failure of the function call, e.g. if the function call refers to an uninitialised resource it will fail.

admitCallToResource( ) checks the current calls in progress for the resourceId/partitionId combination, and if it is less than the currently-set then it increments the count of current calls in progress and sets admitted to true.

removeCallFromResource( ) decrements the current calls in progress for the resourceId/partitionId combination.

setMaximumForResource ( ) is used at TCAP Server startup time to set default local (per TCAP Server) values for partition sizes which will be used in the event that Memory Channel and the OCS are unavailable. Values supplied to setMaximumForResource( ) are obtained by IpControl from the TCAP Server configuration file.

ResourceManager Class

Within OCS code on both OCS and within TCAP Server, the ResourceManager class encapsulates partition counts in Memory Channel on both TCAP Server and OCS.

In principle, maintenance of an exact global count requires a single count which is accessed atomically for increment and decrement by the various TCAP Servers. However atomic increments and decrements require locking. Use of Memory Channel locks is expensive, requiring at least 2 Memory Channel write operations per lock cycle in addition to the read/modify/write operation which is protected by the lock. Instead, in this preferred implementation, uses a count per TCAP Server. There is then no need for locking, though all writes (for count increments and decrements) must be written to Memory Channel to be accessible to TCAP Servers on other TS boxes. The admitCallToResource( ) function then sums counts of calls in progress over TCAP Servers (requiring only reads from local memory) and compares with the total for the partition (also broadcast via Memory Channel but accessible with a local read) to determine whether to admit the call.

This scheme results in a possibility of small transient errors in port counts (1 or 2 ports). In this application the effects of an error are completely negligible.

TABLE 1

|  | 0 | 1 | 2 | 31 |
|---|---|---|---|---|
| TCS0 (OCS) | 2000 | 600 |  |  |
| TCS1 | 15 | 22 |  |  |
| TCS2 | 17 | 25 |  |  |
|  | 12 | 19 |  |  |
| TCS64 | 0 | 0 |  |  |

The key data structure for ResourceManager is the 2-dimensional array or "table" in shared memory described previously, with rows indexed by TCAP Server identity and a column allocated to each unique tuple of resource identifier and servivce identifier. Only two columns are needed to manage the Voice IP ports for Inbound and Card, but sufficient columns are provided to allow for growth in the number of services and resources. Sparse resource identifier and service identifier tuples will be mapped at startup to a dense set of column indices. Linear search of the mapping will probably be simplest and fastest for the foreseeable number of resources and services.

Management of Soft Partitioning

Operations from M&C

M&C (management and control) screens in a network embodying the invention may display a screen specific to the peripheral, in this case Voice IP, with rows indexed by TCAP Server identifier and columns indexed by service friendly name, initially just Inbound and Card. Cells in this table will show current active connections to Voice IP from each TCAP Server for each service. M&C will also show the total number of Voice IP ports configured as available, the total ports configured as available to each service, and the total of ports not configured to any service. This data will be obtained over the M&C Object Broker interface to OCS using remote method invocations which are logically equivalent to the following member function signatures (note that there will only be one resourceId, referring to VoiceIP, in NIP3)

bool setTotalForResourceAndService(const unsigned int resourceId,
   const unsigned int serviceId,
   const unsigned int total)

Used to set a partition size on a specific resource.

bool getTotalForResourceAndService(const unsigned int resourceId,
   const unsigned int serviceId,
   unsigned int& total)

Used to query a partition size (particularly at startup when partition sizes are set by OCS from its configuration file).

bool zeroCountsForResourceAndService(const unsigned int resourceId,
   const unsigned int serviceId,
   const unsigned int tcsId)

Used to zero the counts for a specific partition in the event that the count has drifted away from true calls in progress.

bool getTotalForResource(const unsigned int resourceId)

Used to get total ports configured as available on a specific resource.

bool getCountsForResourceAndService(const unsigned int resourceId,

```
    const unsigned int serviceId,
    const unsigned int tcsId,
    unsigned int& count)
```
Used to get counts of active connections for each resource, service, and TCAP Server.

Display of Rejection Counts Due to Soft Partitioning

Use of the OCS congestionNotify( ) mechanism will ensure display of rejection counts on the standard M&C screen for OCS rejection stats Alarms OCS will raise 2 new alarms per service/resource tuple: an "amber alert" when connections for the partition exceeds a fraction f1 of the configured maximum, cleared when connections drop below f2 of the maximum; and a "red alert" when connections for the partition exceeds a fraction f3 of the configured maximum, cleared when connections drop below f4 of the maximum. OCS will raise or clear these alarms as a result of a frequent scheduled check( ) function called on the ResourceManager object.

Other alarms related to low-level problems will also be defined.

Configuration

On TCS—configured maxima per resource-service tuple, per TCAP Server, for use if OCS is unavailable.

Figure 5:
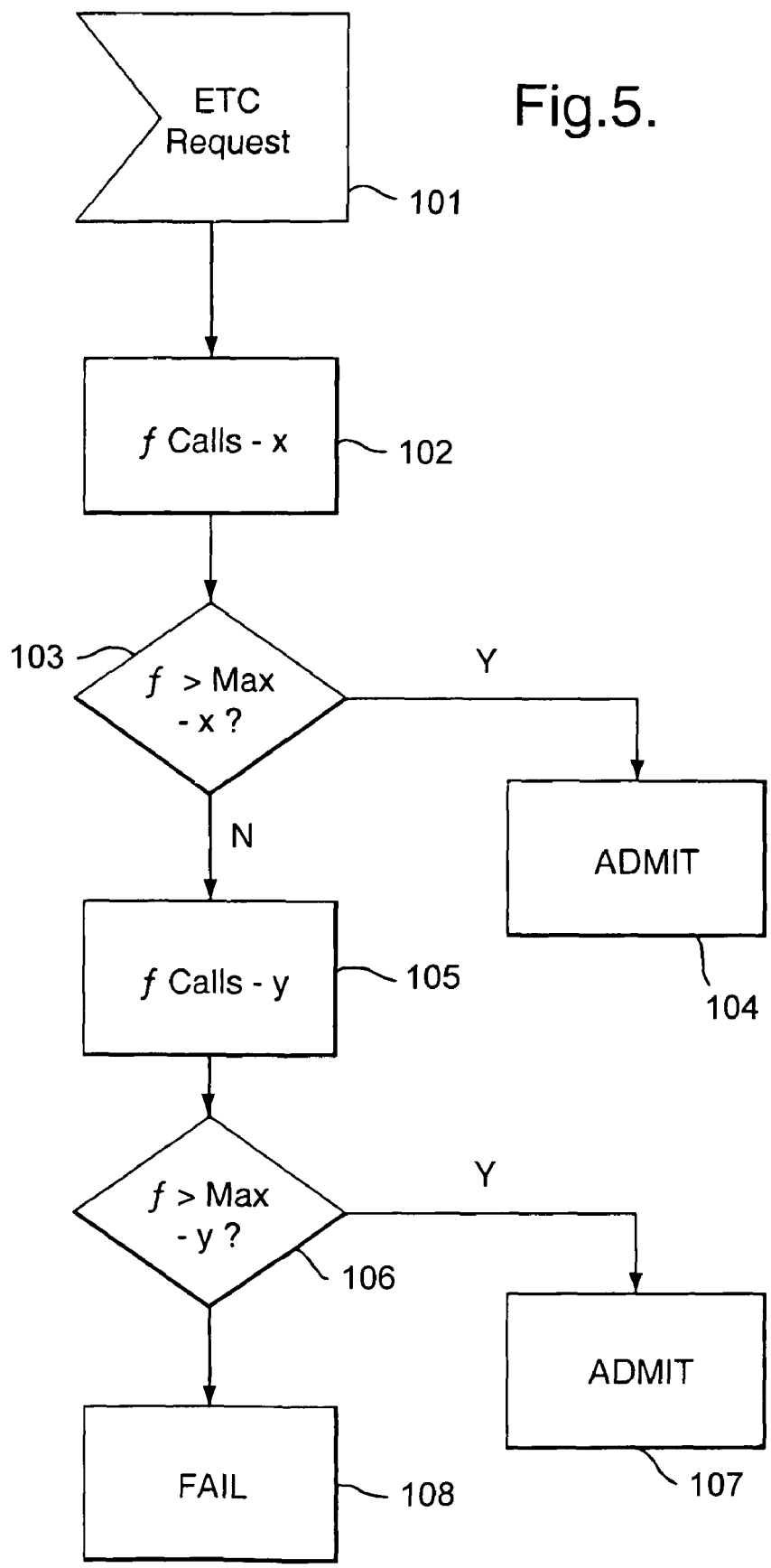
FIG. 5 is flow diagram illustrating an alternative embodiment.

On OCS—configured maxima per resource-service tuple, for the whole site; configured total of available ports per resource; configurable number of columns for resource-service tuples On M&C—mapping of service key (used as service identifier) to service friendly name As described above, the function admitCallToResource ( ) is used to determine whether a new request to establish a connection with the resource platform is to be admitted. In the example described above, the request is simply refused if the limit for the particular service has been reached. In an alternative embodiment, one service is allowed to borrow resource from another service, provided that the overall capacity of the resource platform is sufficient. This is illustrated in the flow diagram of FIG. 5, which shows the steps implemented by the admitCallToResource( ) function in this case. As before, when an ETC request is received for service x (step 1) the total number of calls for x over all servers is determined (step 2) and compared with the maximum (step 3). If the maximum is not yet reached then the request is admitted (step 5) and the count incremented. If the service maximum is reached, then the total number of calls for the other service, service y, is determined. If the total for service y falls below the maximum for service y by more than a predetermined amount (step 6) the service x call is admitted and the count for service x incremented. The port "borrowed" from service y is released by service x as soon as the call is completed.

What is claimed is:

1. A method of operating a communications network including a plurality of network switches, a service platform connected by a signalling interface to the plurality of network switches, and a service resource platform, the method comprising:
   when a service provisioned for a party to a call requires service resources from the service resource platform then, under control of the service platform, connecting a party to the call via a network switch to the service resource platform;
   for each of a plurality of different services requiring the service resources of the service resource platform, maintaining a count of the respective number of ongoing calls concurrently connected to the service resource platform;
   storing for at least one of the plurality of services a maximum count value; and
   connecting a further call to the service resource platform when the count maintained for the said service is less than the maximum count value.

2. A method as in claim 1, in which the service resource platform has a single network address and a plurality of ports associated with said single network address, and a common range of ports are accessed by the plurality of services.

3. A method as in claim 1 comprising storing the said count of the respective number of ongoing calls connected to the service resource platform for each of the plurality of different services in an overload control server connected to the service platform.

4. A method as in claim 1 in which the service platform includes a plurality of transaction servers and in which, in the step of maintaining a count, a separate count is maintained, for each service, for each of the plurality of transaction servers.

5. A method as in claim 2 comprising storing the said count of the respective number of ongoing calls connected to the service resource platform for each of the plurality of different services in an overload control server connected to the service platform.

6. A method as in claim 2 in which the service platform includes a plurality of transaction servers and in which, in the step of maintaining a count, a separate count is maintained, for each service, for each of the plurality of transaction servers.

7. A method as in claim 3 in which the service platform includes a plurality of transaction servers and in which, in the step of maintaining a count, a separate count is maintained, for each service, for each of the plurality of transaction servers.

* * * * *